(12) United States Patent
Tomomatsu

(10) Patent No.: US 8,379,270 B2
(45) Date of Patent: Feb. 19, 2013

(54) APPARATUS AND METHOD FOR CONTROLLING PRINTING

(75) Inventor: Yoshiaki Tomomatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 12/509,309

(22) Filed: Jul. 24, 2009

(65) Prior Publication Data

US 2010/0020358 A1    Jan. 28, 2010

(30) Foreign Application Priority Data

Jul. 28, 2008 (JP) .................................. 2008-193991

(51) Int. Cl.
*H04N 1/405* (2006.01)
*G06F 3/12* (2006.01)
(52) U.S. Cl. ...................... 358/3.06; 358/1.15; 358/1.13
(58) Field of Classification Search ................ 358/3.06, 358/1.16, 1.9, 1.1, 1.18, 1.14, 1.15, 1.12, 358/1.13; 347/19, 20, 40

See application file for complete search history.

(56) References Cited

U.S. PATENT DOCUMENTS 6,538,764 B2 * 3/2003 Ueda ............................ 358/1.16
6,734,986 B1 * 5/2004 Kuroi et al. .................. 358/1.16

FOREIGN PATENT DOCUMENTS

| JP | H6-202822 A | 7/1994 |
| JP | 09234910 A | 9/1997 |
| JP | 11177788 A | 7/1999 |
| JP | 2005352744 A | 12/2005 |

* cited by examiner

*Primary Examiner* — Charlotte M Baker
(74) *Attorney, Agent, or Firm* — Canon U.S.A., Inc. IP Division

(57) ABSTRACT

An order in which to delete bands is defined in advance according to a table of importance levels of bands. If the free storage space of a hard disk becomes equal to or lower than a threshold value after a new printer command of a band is stored, printer commands stored in the hard disk are deleted in units of bands in accordance with the defined importance levels of bands. If the free storage space of the hard disk becomes greater than the threshold value, new printer commands are stored in units of bands on the hard disk. In the controlling of the printing for second and following ones of the plurality of copies, printer commands stored on the hard disk are transmitted to a printer. However, printer commands that are not stored on the hard disk are again produced.

20 Claims, 9 Drawing Sheets

APPARATUS AND METHOD FOR CONTROLLING PRINTING

BACKGROUND OF THE INVENTION

1. Field of the Invention

The present invention relates to a technique to control printing and more particularly to a technique to control printing a plurality of copies.

2. Description of the Related Art

A print system is known which performs printing using a printing apparatus based on a raster image sent from a host computer. The host computer produces a raster image by performing a process described below. In the host computer, first, application software produces data such as characters, graphics, pictures, etc. The produced data is deployed in a virtual page memory by a printer driver running on the host computer. The data deployed in the page memory is subjected to a process such as a color conversion, halftone processing, etc., and the resultant data is transmitted as a printer command to a printer. Note that the application software is hereinafter referred to simply as the application.

In such a print system, a very large processing load is imposed on the host computer. In such a situation, a plurality of copies may be printed in such a manner, for example, as disclosed in Japanese Patent Laid-Open No. 6-202822. First, a printer command produced as a result of the process performed in printing of a first one of copies is stored in an auxiliary storage device such as a hard disk. When second and following ones of the plurality of copies are printed, the printer command stored in the auxiliary storage device is transmitted to the printer. However, if the data size of the printer command is greater than a free storage space of the auxiliary storage device, the printer command cannot be stored in the auxiliary storage device. In such a case, the printer command is stored in the auxiliary storage device only when the auxiliary storage device has a free storage space large enough to store one page of print data, but otherwise the printer command is not stored.

However, there is a tendency that an increasing number of documents are produced in the form of an electronic document, and each document tends to have an increasing number of pages. Furthermore, an increase in resolution of a printer causes an increase in the size of a printer command (print image data) per page. This results in an increase in the probability that printer commands of all pages cannot be stored in the auxiliary storage device. In such a case, printer commands of only part of the all pages are stored in the auxiliary storage device, and the remaining pages whose printer commands are not stored in the auxiliary storage device cannot be printed at a high speed in the printing process for second and following ones of the plurality of copies.

In the printing operation, the application and an operating system (hereinafter referred to simply as an OS) also use a large amount of memory space of the auxiliary storage device. Therefore, if all the free storage space of the auxiliary storage device is used to store the print data, the application or the OS becomes impossible to correctly operate or the system is brought into an unstable state.

A wide variety of systems have become available. In some systems, the auxiliary storage device does not have a free storage space large enough to store even one page of printer commands. For example, this can occur when printing is performed using a portable telephone or a game machine as a host computer. Most portable telephones or game machines used as a host computer do not have an auxiliary storage device, and thus printer commands are stored in a main memory of a host computer or a printer. However, the main memory has a very small free storage space. In many cases, even one page of printer commands cannot be stored in the main memory.

In recent years, a low-cost printer integrated with a scanner called a multifunction printer has become very popular. However, most such multifunction printers do not have an auxiliary storage device, and thus when a plurality of sets are copied directly from the scanner to the printer, printer commands are stored in a main memory of the multifunction printer because there is no other available memory space. However, in many cases, because of the small storage capacity of the main memory, even one page of printer commands cannot be stored.

SUMMARY OF THE INVENTION

In view of the above, the present invention provides a technique to perform printing of a plurality of copies in a very efficient manner.

According to an embodiment of the present invention, there is provided a print control apparatus including a storage device and configured to supply a printer command used in a printing process performed by a printer in accordance with a print request specifying printing a plurality of copies, comprising a generation unit configured to generate a printer command in units of bands in accordance with the print request, a transmission unit configured to transmit the printer command generated by the generation unit to a printer, and a storing control unit configured to control storing of the printer command such that in the printing process for a first one of the plurality of copies, the printer command generated by the generation unit is stored in units of bands in the storage device, wherein the printing process for a second one of copies is performed such that as for the printer command stored in the storage device by the storing control unit, the transmission unit transmits the printer command to the printer, and as for a printer command that are not stored in the storage device by the storing control unit, the generation unit again generates the printer command and the transmission unit transmits the generated printer command to the printer.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention are described below in detail with reference to accompanying drawings. The purpose of the embodiments described below is not to limit the invention. All parts, elements, or steps described in embodiments are not necessarily needed to practice the invention.

First Embodiment

A first embodiment of the present invention is described below.

Figure 1:
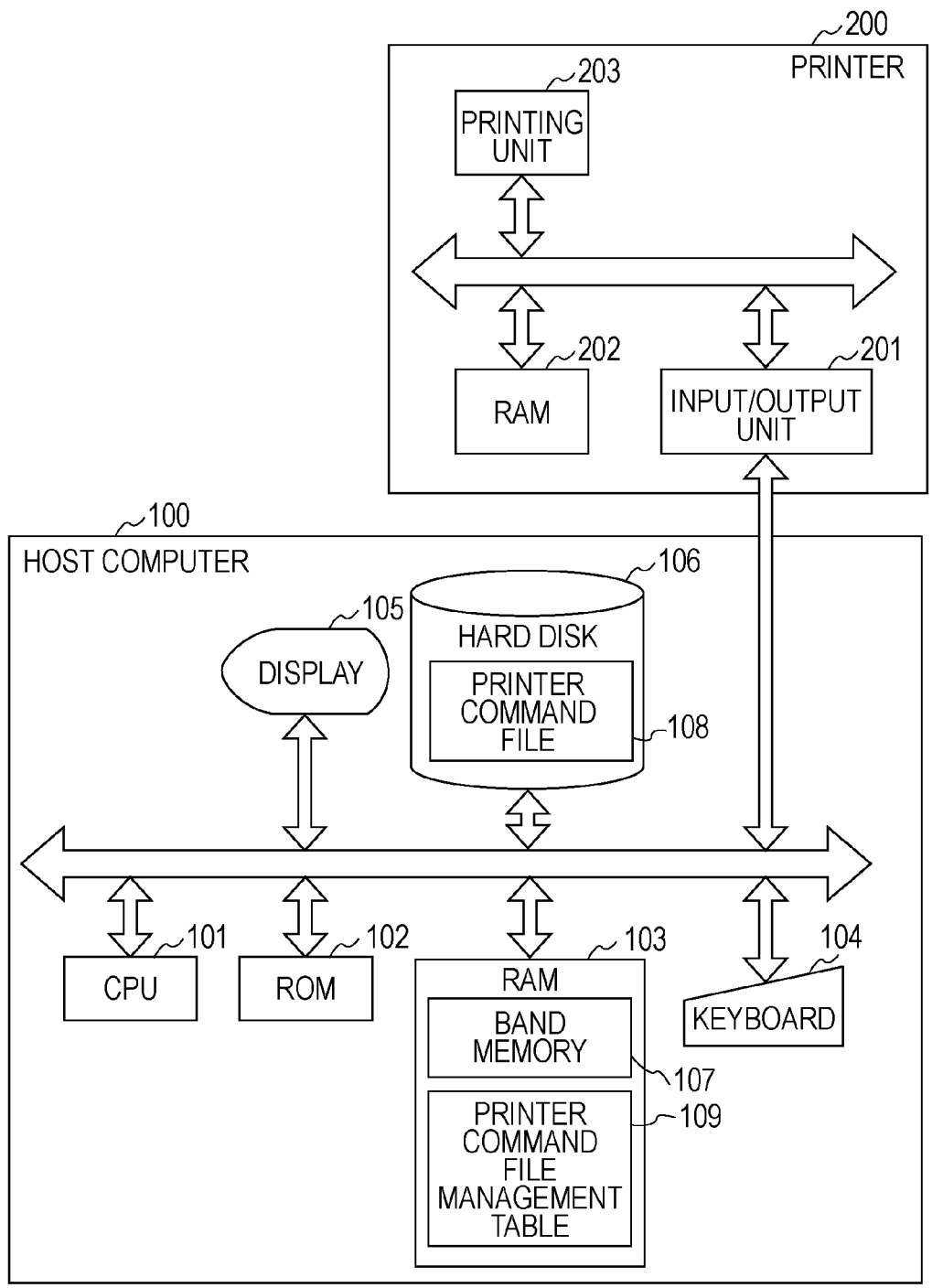
FIG. 1 is a diagram illustrating an example of a configuration of a printing system according to an embodiment of the present invention.
Figure 2:
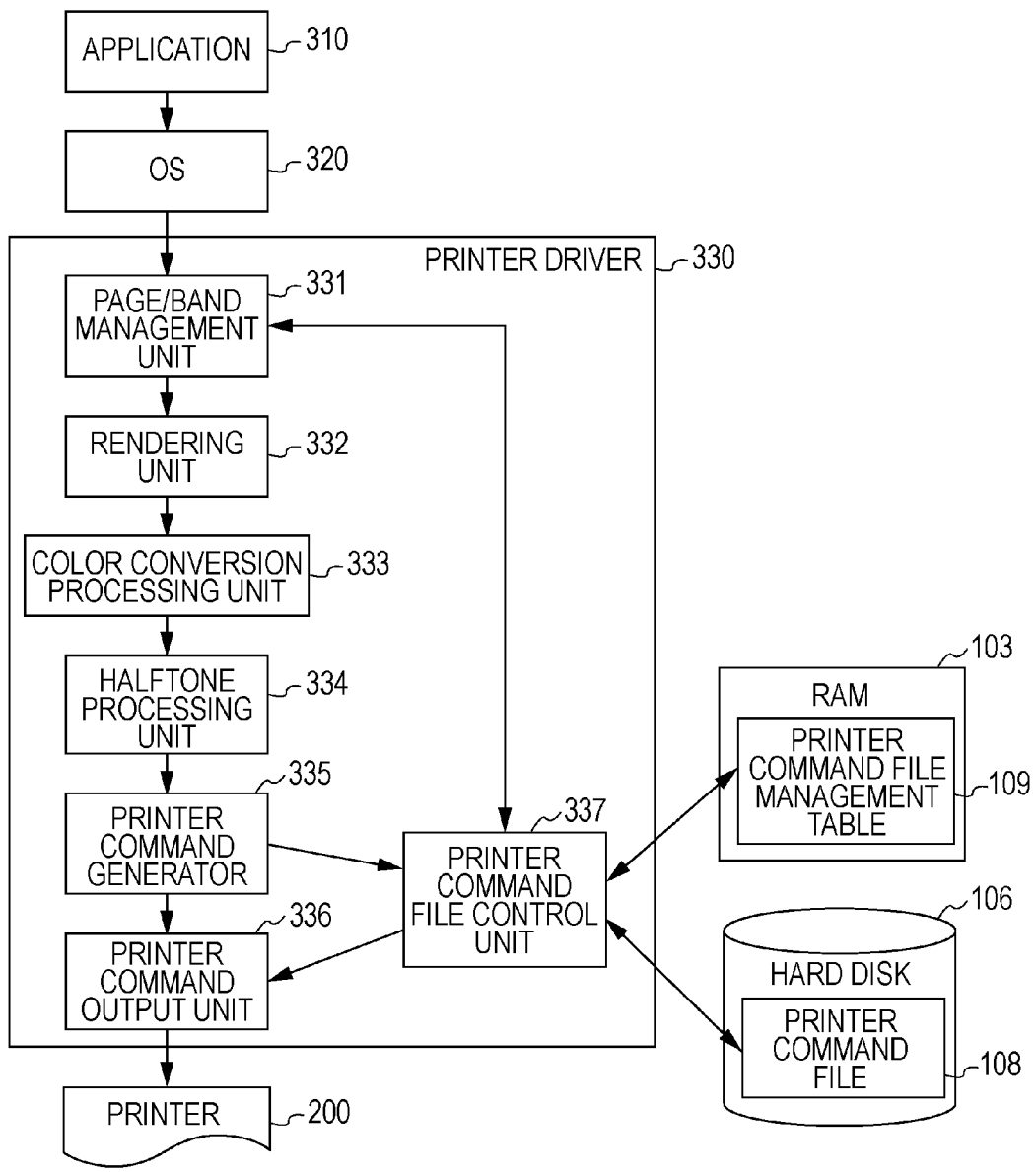
FIG. 2 is a diagram illustrating an example of a functional configuration of a host computer according to an embodiment of the present invention.

FIG. 1 illustrates an example of a configuration of a printing system. FIG. 2 illustrates an example of a functional configuration of a host computer. In the examples shown in FIGS. 1 and 2, the printing system includes a host computer 100 and a printer 200 connected to each other.

First, the host computer 100 is explained below. The host computer 100 includes a CPU 101, a ROM 102, a RAM 103, a keyboard 104, a display 105, and a hard disk 106. These units in the host computer 100 are connected to each other via a system bus.

A boot program is stored in the ROM 102. The RAM 103 is mainly used as a main memory and a work area, and the RAM 103 includes a band memory 107. The band memory 107 is used to convert band area data to be printed into image data. The RAM 103 also includes a printer command file management table 109. The printer command file management table 109 is a table in which a page number, a band position, and a file name of a printer command file 108 are registered in such a manner that they are correlated to each other.

The hard disk 106, which is an example of an auxiliary storage device, is used to store a control program and is also used as a work area. Note that the printer command file 108 is stored on the hard disk 106.

The CPU 101 is configured to control various parts in accordance with the control program stored on the hard disk 106. The keyboard 104 is used to issue a command. The display 105 is configured to display various kinds of information such as a result of processing.

Next, the printer 200 is explained. The printer 200 includes an input/output unit 201, a RAM 202, and a printing unit 203.

The input/output unit 201 is connected to the host computer 100 via a bidirectional interface and is configured to control a data communication process. The RAM 202 is configured to store a printer command received via the input/output unit 201. The printing unit 203 is configured to perform printing in accordance with the printer command stored in the RAM 202.

In FIG. 2, the application 310 produces rendering data of characters, images, diagrams, etc. in accordance with a print request issued by an operator via the keyboard 104, transmits the resultant rendering data to a printer driver 399 via an OS 320, and requests the printer driver 330 to output the rendering data to the printer 200.

Figure 3:
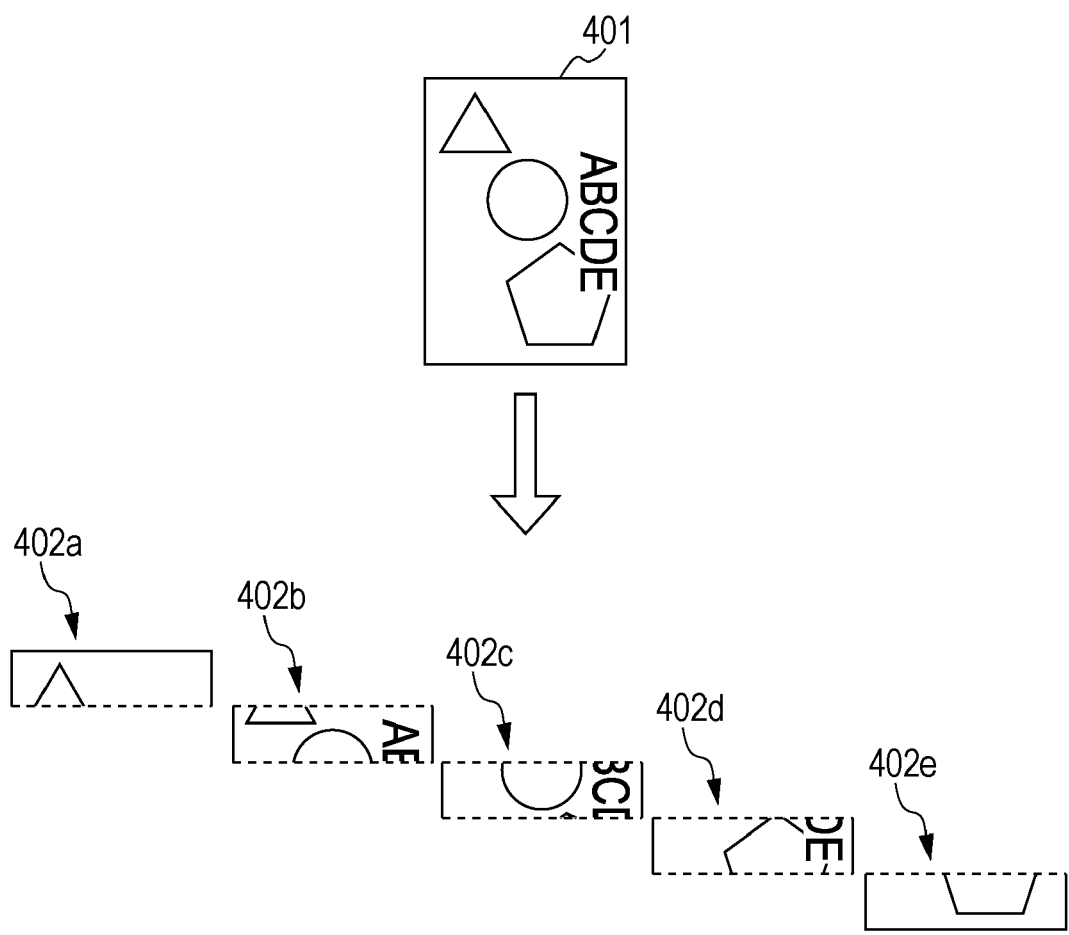
FIG. 3 is a diagram illustrating an example of a page image, which is an example of rendering data, and also illustrating an example of a set of band images produced from the page image.

FIG. 3 illustrates an example of a page image as an example of rendering data and also illustrates an example of a band image produced from the page image.

In a case of a so-called dumb printer or a video printer, the host computer 100 converts a render command into a page image 401, i.e., image data, depending on the resolution of the printer 200, and transmits the resultant page image 401 to the printer 200. More specifically, in the present embodiment, as shown in FIG. 3, the page image 401 is divided into a plurality of band images 402a to 402e, the band images 402a to 402e are deployed in the band memory 107, and resultant data is transmitted to the printer 200.

Figure 4:
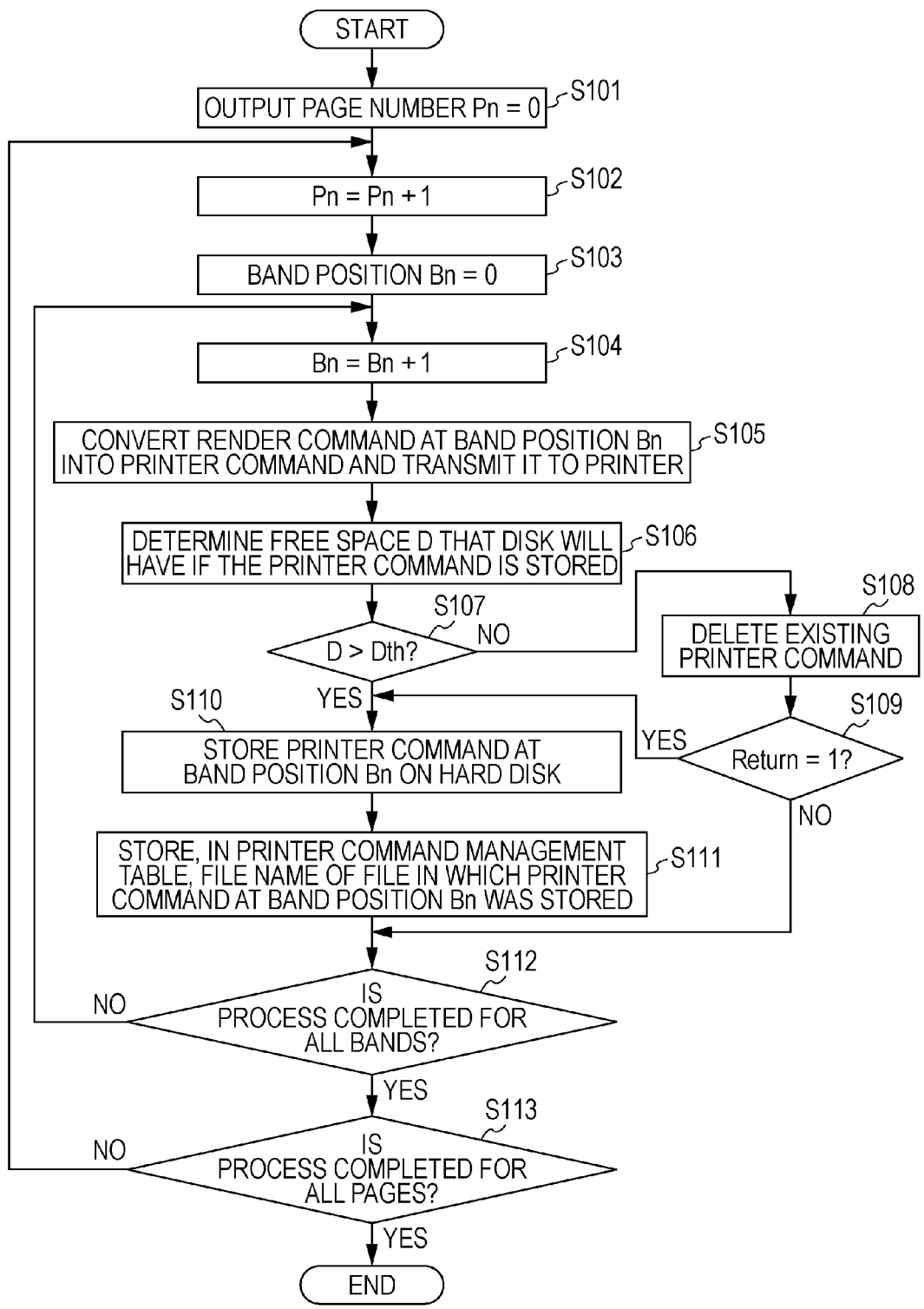
FIG. 4 is a flow chart illustrating an example of a process performed by a printer driver to print a first one of copies according to an embodiment of the present invention.

FIG. 4 is a flow chart illustrating an example of a process performed by the printer driver 330 to print first one of a plurality of copies. In this process, print data of all pages is converted into a band image 402 in units of bands and the resultant band image 402 is converted into a printer command, which is one of print data formats. The printer command is transmitted to the printer 200. At substantially the same time, the printer commands of the band images 402a to 402e (i.e., the printer command of each band image) are stored as a printer command file 108 on the hard disk 106.

If the application 310 issues a command to output a render command to the OS 320, then a page/band management unit 331 of the printer driver 330 receives a render command for each band. A render processing unit 332 renders the render command onto the band memory 107 for each band.

First, in step S101, the page/band management unit 331 initializes a page number Pn indicating the page number of a page to be printed into 0.

In step S102, the page/band management unit 331 increments the page number Pn by one each time the processing encounters a new page.

Next, in step S103, the page/band management unit 331 initializes a band position Bn indicating the band position in each page into 0.

In step S104, the page/band management unit 331 increments the band position Bn by one at a time in each iteration of the process as to the band position.

Next in step S105, the printer driver 330 converts the render command into a printer command on a band-by-band basis and transmits the resultant printer command to the printer 200.

More specifically, in this step S105, the page/band management unit 331 first receives a render command corresponding to the page number Pn and the band position Bn. Next, the render processing unit 332 deploys the render command in the form of a band image 402 in the band memory 107. In general, the band image 402 is represented in the form of sRGB data in the sRGB color space, which is a widely used color space. The color conversion processing unit 333 converts the band image 402 from the sRGB data into RGB data in the RGB color space which is a color space used by the printer 200, and the color conversion processing unit 333 further converts it into CMYK image data in the CMYK color space which is a color space of ink used by the printer 200.

The halftone processing unit 334 performs halftone processing, which is a pseudo halftone processing, on the data of the band image 402 represented as the CMYK image data so that the halftone is represented in the format used by the printer 200. A printer command generator 335 converts the CMYK image data subjected to the halftone processing into a printer command. In this process, a data compression for reducing the data size of the CMYK image data subjected to the halftone processing is performed, and a command is added. A printer command output unit 336 outputs the produced printer command to the printer 200.

A printer command file control unit 337 stores the printer command produced in step S105 as a printer command file 108 on the hard disk 106. The printer command file control unit 337 determines whether the hard disk 106 has a free storage space large enough to store the printer command file 108. More specifically, in step S106, the printer command file control unit 337 determines the free storage space D that the hard disk 106 will have after the printer command file 108 is stored. The free storage space D can be determined by subtracting the data size of the printer command 108 produced in step S105 from the current free storage space of the hard disk 106. This determination in terms of the free storage space of the hard disk 106 may be performed using a function provided by the OS 320.

Next, in step S107, the printer command file control unit 337 determines whether the free storage space D determined in step S106 is greater than a predetermined threshold value Dth. The hard disk 106 is also used by the OS 320 and the application 310 that operate concurrently with the printer driver 330. Therefore, it is necessary that the threshold value Dth should be set to a sufficiently large value. If the hard disk 106 is brought into a state in which there is no further free storage space, the application 310 or the OS 320 becomes impossible to correctly operate or the system is brought into an unstable state. However, if the threshold value Dth is set to be too great, it becomes difficult to store a sufficiently large number of bands of the printer command file 108. This leads to an insufficient use of the hard disk 106, which leads to a reduction in the processing speed. In the present embodiment, the threshold value Dth is determined so as to achieve well-balanced conditions in terms of the above-described factors.

If the result of the determination in step S107 is that the free storage space D of the hard disk 106 is lower than the threshold value Dth, then the processing flow proceeds to step S108. In step S108, depending on the free storage space of the hard disk 106, the printer command file control unit 337 deletes a printer command file 108 of a band with a relatively low priority level from existing printer command files. The details of this step S108 will be described later.

Next, in step S109, the printer command file control unit 337 determines whether the free storage space D has become greater than the threshold value Dth as a result of the deleting of the printer command file 108 in step S108. More specifically, in this step S109, the printer command file control unit 337 determines whether a RETURN value returned as a result of the process in step S108 is equal to 1. If the RETURN value is equal to 0 (No), it is determined that the hard disk 106 does not have a free storage space large enough to store the printer command file 108, and thus the processing flow proceeds to step S112 described below without performing steps S110 and S111.

On the other hand, in a case where it is determined in step S109 that the RETURN value is equal to 1 or in a case where it is determined in step S107 that the free storage space D of the hard disk 106 is greater than the threshold value Dth, the processing flow proceeds to step S110. That is, the processing flow proceeds to step S110 when the hard disk 106 has a free storage space large enough to store the printer command file 108. In step S110, the printer command file control unit 337 stores the printer command corresponding to the band position Bn produced in step S105 as the printer command file 108 on the hard disk 106. The printer command file control unit 337 controls the storing of the printer command file 108 on the hard disk 106 in the manner described above.

Next, in step S111, the printer command file control unit 337 writes the file name of the printer command file 108 stored in the step S110 in the printer command file management table 109 stored in the RAM 103. The processing flow then proceeds to step S112. Thus, in the printer command file management table 109, as described above, the file name of the printer command file 108 corresponding to the page number Pn and the band position Bn is registered. Note that the storage device in which the printer command file management table 109 is stored is not limited to the RAM 103. For example, the printer command file management table 109 may be stored in the same hard disk 106 as that in which the printer command file 108 is stored.

In step S112, the page/band management unit 331 determines whether the process in steps S104 too S111 has been performed for all bands of the current page number Pn. That is, the page/band management unit 331 determines whether all bands of the current page number Pn have been subjected to producing of the printer command, transmission of the printer command to the printer 200, and the storing of the printer command in the hard disk 106. If it is determined that the process in steps S104 to S111 has not been performed for all bands of the current page number Pn, the process in steps S104 to S112 is repeated until the process is completed for all bands.

If the process in steps S104 to S111 is completed for all bands of the current page number Pn, the processing flow proceeds to step S113. In step S113, the page/band management unit 331 determines whether the process in step S102 to S112 has been performed for all page numbers Pn (i.e., for all pages). That is, the page/band management unit 331 determines whether all page numbers Pn (all pages) have been subjected to the producing of the printer command, the transmission of the printer command to the printer 200, and the storing of the printer command on the hard disk 106.

If it is determined that the process in steps S102 to S112 has not been performed for all page numbers Pn (all pages), the process in steps S102 to S113 is repeated until the process is completed for all page numbers.

If the process in steps S102 to S112 is completed for all page numbers Pn (all pages), the process of the flow chart shown in FIG. 4 is ended.

The details of step S108 shown in FIG. 4 are described below. In step S108, as described above, when the free storage space of the hard disk 106 is not large enough, the printer command file control unit 337 deletes part of the existing printer command files 108 stored on the hard disk 106.

The determination as to whether the existing printer command files 108 should be partially deleted may be performed, for example, as follows. That is, the determination may be performed based on the band-to-band correlation indicating whether the result of the process on a particular band has an influence on other bands. Alternatively or additionally, the determination may be performed based on a difference in processing speed between the printer command generation process performed by the printer driver 330 and the printing process performed by the printer 200.

In the case where the determination is based on the band-to-band correlation, the halftone processing by the halftone processing unit 334 may use, for example, an error diffusion method. In the case where the error diffusion method is used, an error that occurs as a result of the halftone processing on a particular pixel of interest is propagated toward pixels that are subjected thereafter to the halftone process. Therefore, it is impossible to start the process from a point in the middle of a page. If the halftone processing unit 334 does not propagate errors for first to Nth bands, and propagates errors starting from an (N+1)th band, then a discontinuity occurs in a result of printing at a boundary between the Nth band and the (N+1)th band. Note that N denotes an integer. Therefore, even in a state in which printer commands 108 has already been stored for first to Nth bands, when the error diffusion process is performed on the (N+1)th band, it is necessary to again perform the halftone processing on the first to Nth bands. That is, it is necessary to again perform the deploying of the render command in the memory by the render processing unit 332, the color conversion process by the color conversion processing unit 333, and the halftone processing by the halftone processing unit 334 for the first to Nth bands.

Therefore, it is necessary to preferentially keep bands located behind in the error propagation direction (i.e., it is necessary to store printer commands associated with these bands), and delete bands (printer commands) in the same direction as the direction in which errors are propagated. This allows it to perform re-processing for only deleted bands, which leads to an increase in the processing speed.

The error diffusion method is a known technique whose details may be found, for example, in "An Adaptive Algorithm for Spatial Gray Scale" in society for Information Display 1975 Symposium Digest of Technical Papers, 1975, 36.

Figure 5A:
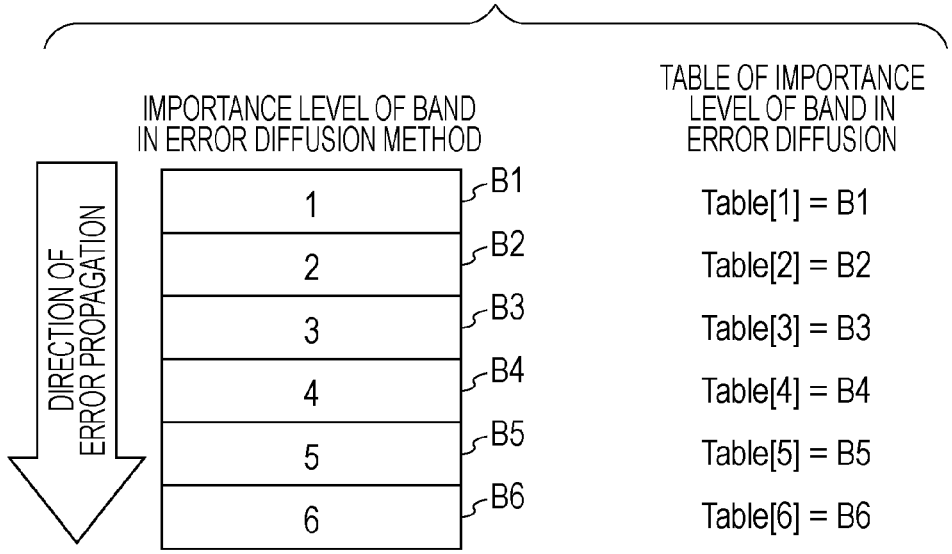
FIGS. 5A and 5B are diagrams illustrating examples as to importance levels of bands and examples of tables of importance levels of bands according to an embodiment of the present invention.

FIG. 5A illustrates an example as to importance levels of bands in error diffusion in the halftone processing and an example of a table of importance levels of bands. In FIG. 5A, the printer command file control unit 337 deletes bands in ascending order of values of importance levels thereof (in order from lowest to highest of priority in keeping bands).

As shown in FIG. 5A, in the halftone processing using the error diffusion method, bands are deleted in the same direction as the direction in which errors are propagated.

The determination may be performed based on the difference in processing speed between the printer command generation process performed by the printer driver 330 and the printing process performed by the printer 200, for example, in a case where a pre-printing process such as a paper feeding process is being performed. In a printing operation, the printer 200 performs the pre-printing process such as the paper feeding process before printing is started for each page. Printing is not performed during the pre-printing process. Therefore, the printer command generation process by the printer driver 330 is performed at a higher processing speed than the printing process by the printer 200. Thus, in printing of a plurality of copies, for a first half part of each page which is supplied first, it is allowed for the printer driver 330 to convert a render command into a printer command and then transmit the resultant printer command to the printer 200 without causing a delay in the printing operation.

The processing time spent by the printer command file control unit 337 of the printer driver 330 to read a printer command from the hard disk 106 and transmit it is shorter than the processing time spent in printing by the printer 200. This can cause the printer driver 330 to have an extra processing time. Therefore, after the printer driver 330 transmits the printer command, the printer driver 330 is allowed to perform a process to produce a next printer command in the extra time until the printer 200 completes the printing operation using the already transmitted printer command. That is, after the printer driver 330 transmits the printer command stored in the printer command file 108, the printer driver 330 is allowed to convert a render commands of a next band into a printer command and transmit it to the printer 200 without causing a delay in the printing operation.

Figure 5B:
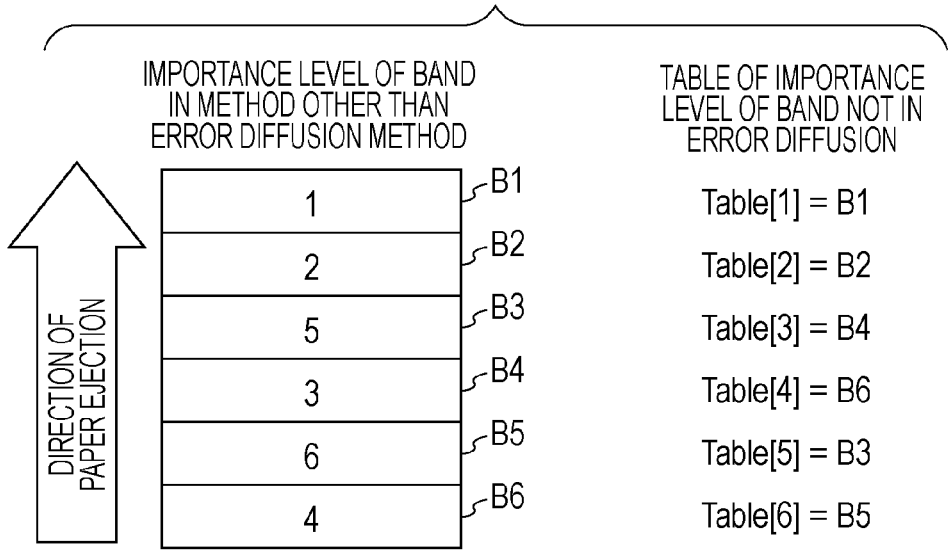

FIG. 5B illustrates an example as to importance levels of bands in the halftone processing using a method other than the error diffusion method and also illustrates an example of a table of importance levels of bands. Also in the example shown in FIG. 5B, the printer command file control unit 337 deletes bands in ascending order of values of importance levels thereof (in order from lowest to highest of priority in keeping bands).

As described above, because of the existence of the initialization process such as the paper feeding process performed by the printer 200, the printer command producing process performed by the printer driver 330 is faster than the printing process performed by the printer 200. Therefore, as shown in FIG. 5B, a first half part of a page (a part that is first fed in (fed out)) is low in importance level. On the other hand, for a second half of each page, it is more efficient to alternately perform the printer command generation process and the transmission of the printer command. Therefore, the importance level is set to be lower every two bands so that bands with a high importance level and band with a low importance level are alternately produced.

As described above, if it is determined in step S107 that the free storage space of the hard disk 106 is equal to or lower than the threshold value Dth, then the process proceeds to step S108 where the existing printer command files 108 are partially deleted. More specifically, in the present embodiment, the partially deleting of the existing printer command files 108 is performed in accordance with the table of importance levels of bands such as that shown in FIG. 5A or 5B.

Figure 6:
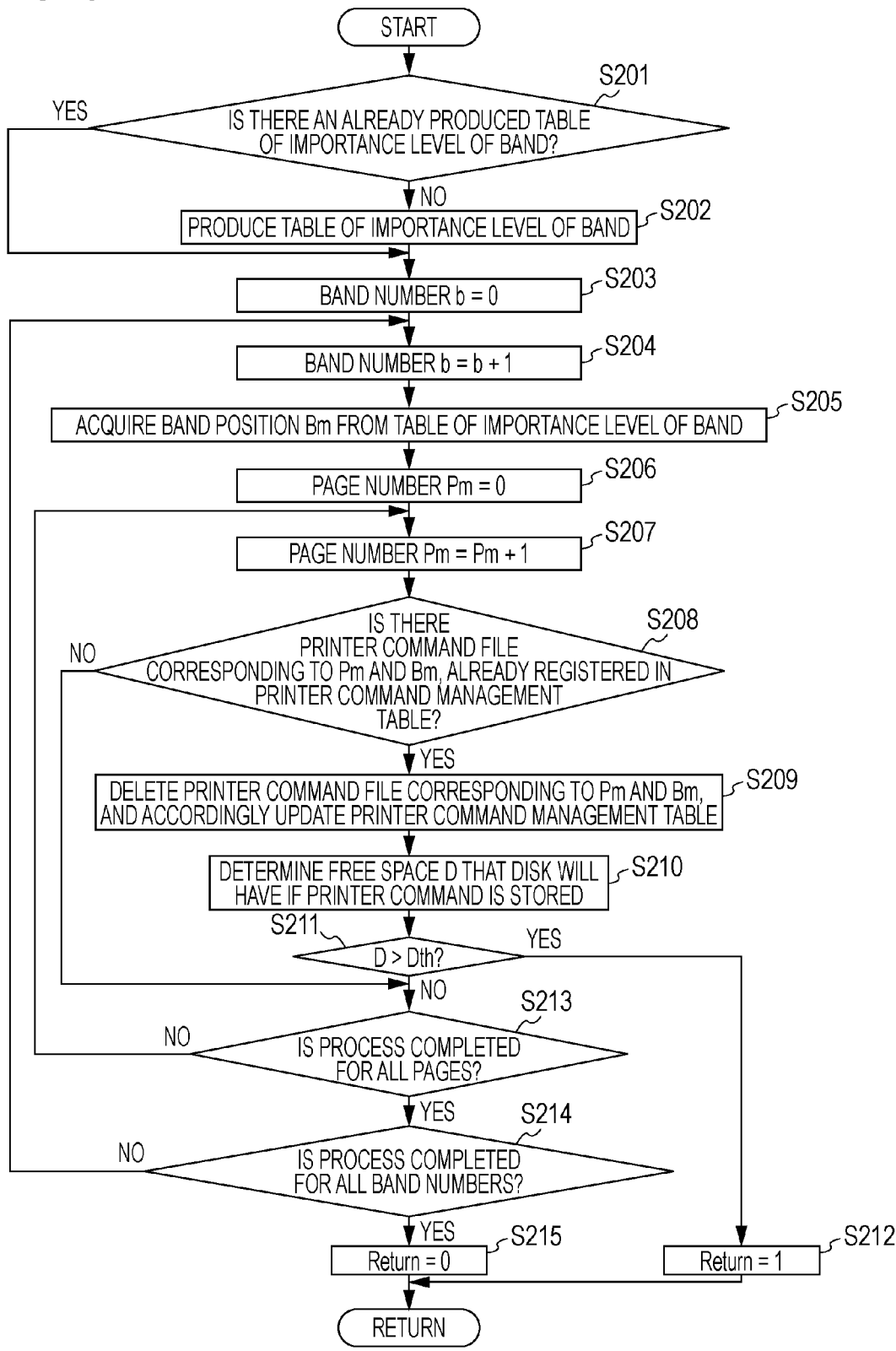
FIG. 6 is a flow chart illustrating details of step S108 shown in FIG. 4 according to an embodiment of the present invention.

FIG. 6 is a flow chart illustrating the details of step S108 shown in FIG. 4.

First, in step S201, the printer command file control unit 337 determines whether a table of importance levels of bands has already been produced. At a point of time at which this step S201 is performed for the first time, the table of importance levels of bands has not yet been produced. Thus, in step S202, the printer command file control unit 337 produces a table of importance levels of bands and sets importance levels of bands. The processing flow then proceeds to step S203. As described above, the table of importance levels of bands is determined based on the correlation between bands in a state in which the halftone processing has been performed or based on the difference in processing speed between the printer command generation process performed by the printer driver 330 and the printing process performed by the printer 200. The printer command file control unit 337 deletes bands sequentially in order specified by the table of importance levels of bands such as that shown on the right-hand side of FIG. 5 thereby achieving high efficiency in the process.

On the other hand, in a case where there is a table of importance levels of bands which has already been produced, it is not necessary to produce a table of importance levels of bands, and thus the processing flow proceeds to step S203 without performing step S202. In step S203, in preparation for deleting the printer command file 108 in order from lowest of the importance level of bands, the printer command file control unit 337 initializes the band number b to 0.

Next, in step S204, the printer command file control unit 337 increases the band number b by one at a time in each iteration of the process associated with the bands.

Next, in step S205, the printer command file control unit 337 acquires a band position Bm corresponding to the band number b based on the table of importance levels of bands produced in step S202. In this process, the table of importance levels of bands used in step S205 may be switched by selecting one of a plurality of tables of importance levels of bands in accordance with setting or the like. For example, the table of importance levels of bands shown on the right-hand side of FIG. 5A may be used when the halftone processing is performed using the error diffusion method, but otherwise the table of importance levels of bands shown on the right-hand side of FIG. 5B may be used. More specifically, for example, when the halftone processing does not use the error diffusion method, if the band number b of interest is, for example, 5, the printer command file control unit 337 accesses the table of importance levels of bands shown on the right-hand side of FIG. 5B and acquires a band position B3 as the band position Bm.

Next, for the band position Bm acquired in step S205, the printer command file control unit 337 deletes printer command files 108 in all pages until the free storage space D of the hard disk 106 becomes greater than the threshold value Dth. More specifically, in step S206, the printer command file control unit 337 initializes the page number Pm to 0.

Next, in step S207, the printer command file control unit 337 increments the page number Pm by one at a time in each iteration of the process associated with the pages.

Next, in step S208, the printer command file control unit 337 determines whether a printer command file 108 corresponding to the page number Pm and the band position Bm is registered in the printer command file management table 109. This determination may be performed by determining whether a file name of the printer command file 108 is registered in the printer command file management table 109. Note that the page number Pm used in step S208 is that which has been set in step S207, the band position Bm is that which has been acquired in step S205, and the printer command file management table 109 is that which has been produced in step S111 in FIG. 4.

In a case where the result of the determination in step S208 is that there is no corresponding printer command file 108 registered in the printer command file management table 109, steps S209 to S211 are skipped and the processing flow proceeds to step S213.

On the other hand, if there is a corresponding printer command file 108 registered in the printer command file management table 109, the processing flow proceeds to step S209. In step S209, the printer command file control unit 337 controls the storage of the printer command file 108 on the hard disk such that the existing printer command file 108 detected in step S208 is deleted. The printer command file control unit 337 then deletes the file name of the deleted printer command file 108 from the printer command file management table 109.

Next, in step S210, a recalculation is performed to estimate the free storage space D that the hard disk 106 will have after the printer command file 108 is stored.

Next, in step S211, the printer command file control unit 337 determines whether the free storage space D of the hard disk 106 estimated in step S106 is greater than the threshold value Dth. If it is determined that the free storage space D of the hard disk 106 is greater than the threshold value Dth, the processing flow proceeds to step S212. In step S212, the printer command file control unit 337 sets the RETURN value to 1. The processing flow then proceeds to step S109 in FIG. 4.

In the case where the free storage space D of the hard disk 106 is equal to or lower than the threshold value Dth, the processing flow proceeds to step S213. As described above, also in the case where it is determined in step S208 that there is no corresponding printer command file 108 registered in the printer command file management table 109, the processing flow proceeds to step S213.

In step S213, the printer command file control unit 337 determines whether the deleting of the printer command file 108 corresponding to the band position Bm is completed for all pages. If it is determined that the deleting of the printer command file 108 corresponding to the band position Bm is not completed for all pages, the processing flow returns to step S207. The process in steps S207 to S211 and S213 is repeated until the deleting of the printer command file 108 corresponding to the band position Bm is completed for all pages or until the free storage space D of the hard disk 106 becomes greater than the threshold value Dth.

If the deleting of the printer command file 108 corresponding to the band position Bm is completed for all pages, the processing flow proceeds to step S214. In step S214, the printer command file control unit 337 determines whether the deleting of the printer command file 108 is completed for all band numbers. If it is determined that the deleting of the printer command file 108 is not completed for all band numbers, the processing flow returns to step S204. The process in steps S204 to S214 is repeated until the deleting of the printer command file 108 is completed for all band numbers or until the free storage space D of the hard disk 106 becomes greater than the threshold value Dth.

If the deleting of the printer command file 108 is completed for all band numbers, the processing flow proceeds to step S215. Note that the processing flow proceeds to step S215 when the free storage space of the hard disk 106 is not much enough even after the printer command file 108 is entirely deleted. Therefore, in step S215, the printer command file control unit 337 sets the RETURN value to 0. The process then returns to step S109 in FIG. 4.

At this point of the processing flow, the processing is complete for the first one of the plurality of copies.

Next, referring to a flow chart shown in FIG. 7, an example of a process performed by the printer driver 330 to print second and following copies is described below.

First, in step S301, the page/band management unit 331 initializes the page number Pn to be printed to 0.

In step S302, the page/band management unit 331 increments the page number Pn to be printed by one at a time in each iteration of the process associated with the page.

Next, in step S303, the page/band management unit 331 initializes the band position Bn of each page to 0.

Next, in step S304, the page/band management unit 331 increments the band position Bn by one at a time in each iteration of the process as to the bands.

Next, in step S305, the printer command file control unit 337 determines whether a printer command file 108 corresponding to the page number Pn and the band position Bn is registered in the printer command file management table 109. This determination may be performed by determining whether a file name of the printer command file 108 is registered in the printer command file management table 109. Note that the page number Pn used in step S305 is that which has been set in step S302, the band position Bn is that acquired in step S304, and the printer command file management table 109 is that produced, for example, in step S111 in FIG. 4.

In a case where the result of the determination in step S305 is that there is no corresponding printer command file 108 registered in the printer command file management table 109, the processing flow proceeds to step S309 described below.

On the other hand, if there is a corresponding printer command file 108 registered in the printer command file management table 109, the processing flow proceeds to step S306. In step S306, the printer command file control unit 337 reads a printer command corresponding to the page number Pn and the band position Bn from the printer command file 108 acquired according to the result of the determination in step S305. The printer command output unit 336 outputs the read printer command to the printer 200.

After the printer command is transmitted in the above-described manner, the processing flow proceeds to step S307.

In step S307, the printer command file control unit 337 determines whether the printer command file 108 corresponding to the page number Pn and the band position Bn is to be reused. That is, the printer command file control unit 337 determines whether the copy being currently subjected to the process is the last one of the plurality of copies.

If it is determined that the current copy is not the last one of the plurality of copies, the processing flow proceeds to step S310 described below.

On the other hand, if the current copy is the last one of the plurality of copies, the processing flow proceeds to step S308. In step S308, the printer command file control unit 337 deletes the printer command file 108 corresponding to the page number Pn and the band position Bn from the hard disk 106 because this printer command file 108 is not to be reused. The processing flow then proceeds to step S310.

As described above, in the case where it is determined in step S305 that there is no corresponding printer command file 108 registered in the printer command file management table 109, the processing flow advances to step S309. In step S309, the printer driver 330 again produces the printer command by converting the render command corresponding to the page number Pn and the band position Bn into the printer command for each band, and the printer driver 330 transmits the resultant printer command to the printer 200. Note that step S309 described above may be performed in a similar manner to step S105. The processing flow then proceeds to step S310.

In step S310, the page/band management unit 331 determines whether the printer command has been transmitted to the printer 200 for all bands of the current page number Pn. If it is determined that the printer command has not been transmitted to the printer 200 for all bands of the current page number Pn, steps S304 to S310 are repeated until the transmission is completed for all bands.

If the transmission of the printer command to the printer 200 is completed for all bands of the current page number Pn, the processing flow proceeds to step S311. In step S311, the page/band management unit 331 determines whether the printer command has been transmitted to the printer 200 for all pages. If it is determined that the transmission of the printer command to the printer 200 is not completed for all pages, steps S302 to S311 are repeated until the transmission is completed for all pages.

If the transmission of the printer command to the printer 200 is completed for all pages, the processing flow proceeds to step S312. In step S312, the page/band management unit 331 determines whether the printer command has been transmitted to the printer 200 for all copies. If it is determined that the transmission of the printer command to the printer 200 is not completed for all copies, steps S301 to S312 are repeated until the transmission of the printer command to the printer 200 is completed for all copies.

Figure 7:
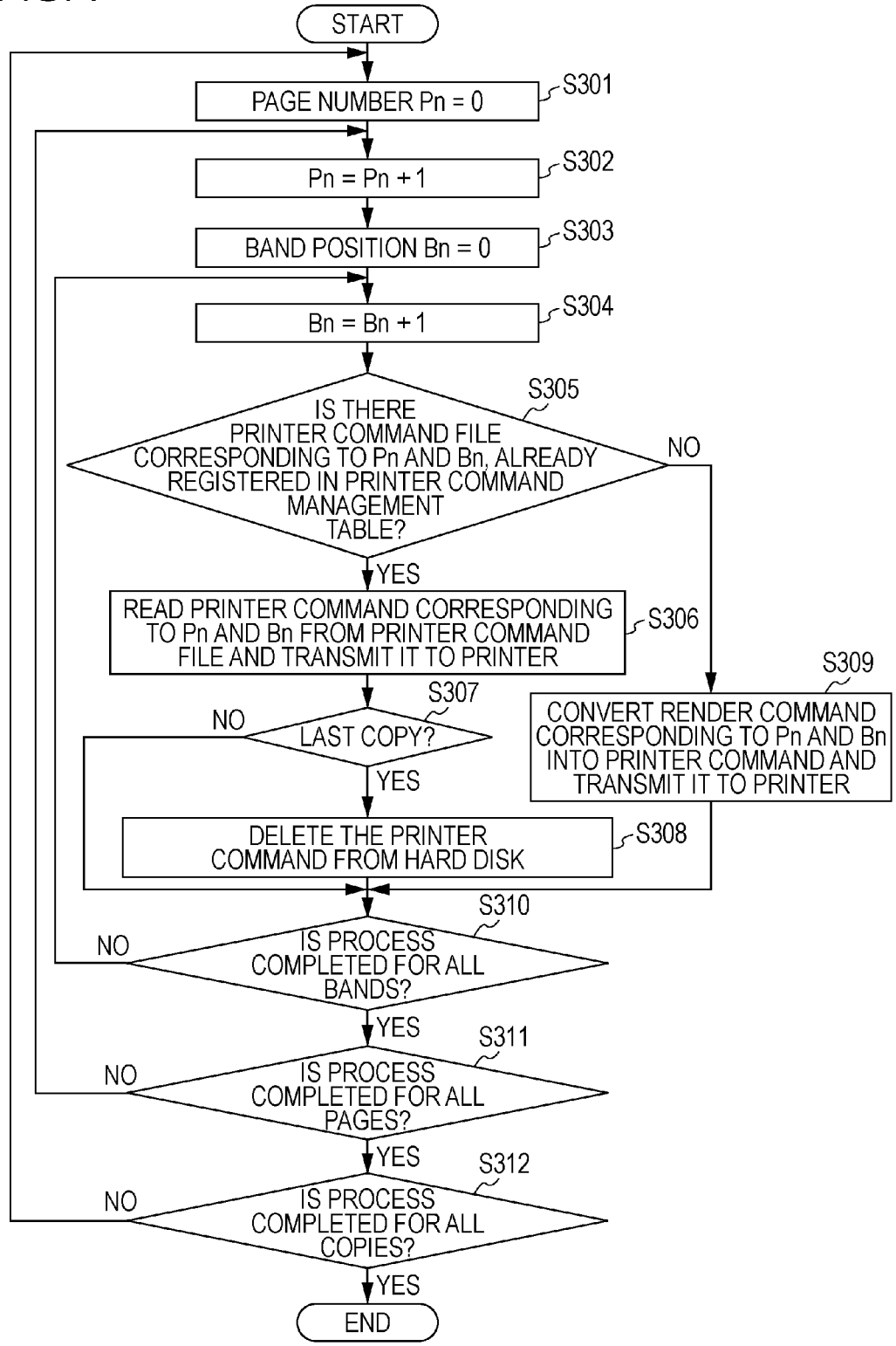
FIG. 7 is a flow chart illustrating an example of a process performed by a printer driver to print second and following copies according to an embodiment of the present invention.

If the transmission of the printer command to the printer 200 is completed for all copies, the process shown in the flow chart of FIG. 7 is ended.

Note that values of parameters used in the present embodiment may be stored, for example, in the RAM 103.

In the present embodiment, as described above, the order in which to delete bands is defined in advance according to the table of importance levels of bands. If the free storage space D of the hard disk 106 becomes equal to or lower than the threshold value after a new printer command for a band is stored, one or more printer commands stored in the hard disk 106 are deleted in units of bands in accordance with the defined importance levels of bands. If the free storage space D of the hard disk 106 becomes greater than the threshold value, new printer commands are stored in units of bands on the hard disk 106. In the controlling of the printing for second and following ones of the plurality of copies, printer commands stored on the hard disk 106 are transmitted to the printer 200. However, printer commands that are not stored on the hard disk 106 are again produced.

When the hard disk 106 has sufficiently much free storage space, printer commands may be stored in units of bands in a manner different from the embodiment described above (in order different from the order in which printing is performed). However, when there is a correlation between bands, if printer commands are stored in units of bands in the above-described manner, a problem can occur as described below. That is, when printing is performed for second and following ones of a plurality of copies, it may be necessary to perform the process from the beginning although there are some printer commands stored, which can make it difficult to perform the printing process for the second and following copies at a high speed.

For example, when the halftone processing is performed using the error diffusion method, errors arising as a result of the halftone processing on a pixel of interest are propagated to pixels subsequently subjected to the halftone processing as described above. Therefore, the result of the halftone processing has an influence on a next band. Therefore, even in a case where there are printer commands stored for first to Nth bands, to perform the halftone processing on an (N+1)th band, it is necessary to again deploy render commands of an Nth band in a memory from the beginning and it is necessary to again perform the color conversion process. Thus, it can be difficult to efficiently process a page.

In contrast, the present embodiment of the invention has the advantage that because the order of deleting bands is defined in advance in accordance with the table of importance levels of bands, it is possible to properly select bands to be stored on the hard disk 106 and band not to be stored on the hard disk 106 taking into account the correlation between bands and the process for printing. Therefore, in the printing of a plurality of copies, even in a case where the host computer 100 or the printer 200 cannot store printer commands for all pages to be printed, it is possible to store printer commands in an efficient manner. Thus, it is possible to increase the throughput in the printing of a plurality of copies.

In the present embodiment, as described above, an optimum table of importance levels of bands is selected depending on whether the halftone processing is performed using the error diffusion method, thereby making it possible to perform steps of printing in an optimized manner.

Modifications

In the embodiment described above, for simplicity of illustration, the processing time for producing printer commands of respective bands and sizes of the printer commands are not considered. The process may be performed taking into account the processing time for producing printer commands of respective bands and sizes of the printer commands. For example, in step S110 in FIG. 4, in a case where printer commands can be produced in a short time without causing a delay in the printing process or in a case where the printer command size is greater than a threshold value, the printer commands may not be stored on the hard disk 106. In step S111 in FIG. 4, information indicating the processing time needed for producing printer commands and information indicating the size of the printer command file 108 may be described in the printer command file management table 109. This makes it possible to preferentially store a band of a printer command file with a large size per unit processing time or conversely preferentially delete a printer command file with a large size. It may also become possible to delete bands in order from shortest to longest of processing time needed for the rendering process. It may also become possible to delete bands in the same order as the order in which bands of a page are supplied. It may also become possible to delete bands in such a manner that among a plurality of bands of each page to be printed, only bands including a rendering area are stored and the other bands are deleted. Note that the method of producing the table of importance levels of bands is not limited to those described above. Also note that the table of importance levels of bands is not necessarily needed.

In the embodiment described above, the printer command files 108 are stored on the hard disk 106. Alternatively, the RAM 103 may be used to store the printer command files 108. Still alternatively, the printer command files 108 may be stored in the RAM 202 disposed in the main part of the printer 200. In this case, it is necessary for the host computer 100 to control storing and deleting of the printer command files 108, and it is necessary for the printer 200 to control printing using the printer command files 108. The printer 200 may independently control storing or deleting of printer command files 108. In this case, in the printing process for second and following ones of a plurality of copies, the printer 200 may request the host computer 100 to output printer command files 108 of areas that are stored.

In the embodiment described above, when the free storage space D of the hard disk 106 is greater than the threshold value Dth, printer commands are stored in unit of bands on the hard disk 106 (steps S105 to S107, S110, etc., in FIG. 4). Alternatively, printer commands may be stored in a different manner. For example, when it is allowed to store all printer commands, all printer commands may be stored at a time.

Second Embodiment

Next, a second embodiment of the present invention is described below. In the first embodiment described above, after printer command files 108 are produced once, the produced printer command files 108 are partially deleted depending on the free storage space of the hard disk 106. This is partially because sizes of printer command files 108 vary depending on the rendering data and the number of pages and partially because the using the hard disk 106 by the application 310 or the OS 320 can cause a frequent change in the free storage space of the hard disk 106. However, in a case where the sizes of printer command files 108 of respective bands and the number of pages are known and it is possible to predict the amount of storage space of the hard disk 106 used by the application 310 or the like, it is possible to make a determination in advance as to the number of bands to be stored depending on the free storage space of the hard disk 106. In this case, it is not necessary to perform the inefficient process to produce and delete printer command files 108, and thus it is possible to achieve higher efficiency in the processing. As described above, the second embodiment is different from the first embodiment in the manner in which printer commands are stored on the hard disk 106. Thus, in the following explanation of the present embodiment, similar parts to those of the first embodiment are denoted by similar reference numerals used in FIGS. 1 to 7, and a duplicated explanation thereof will be omitted.

Figure 8:
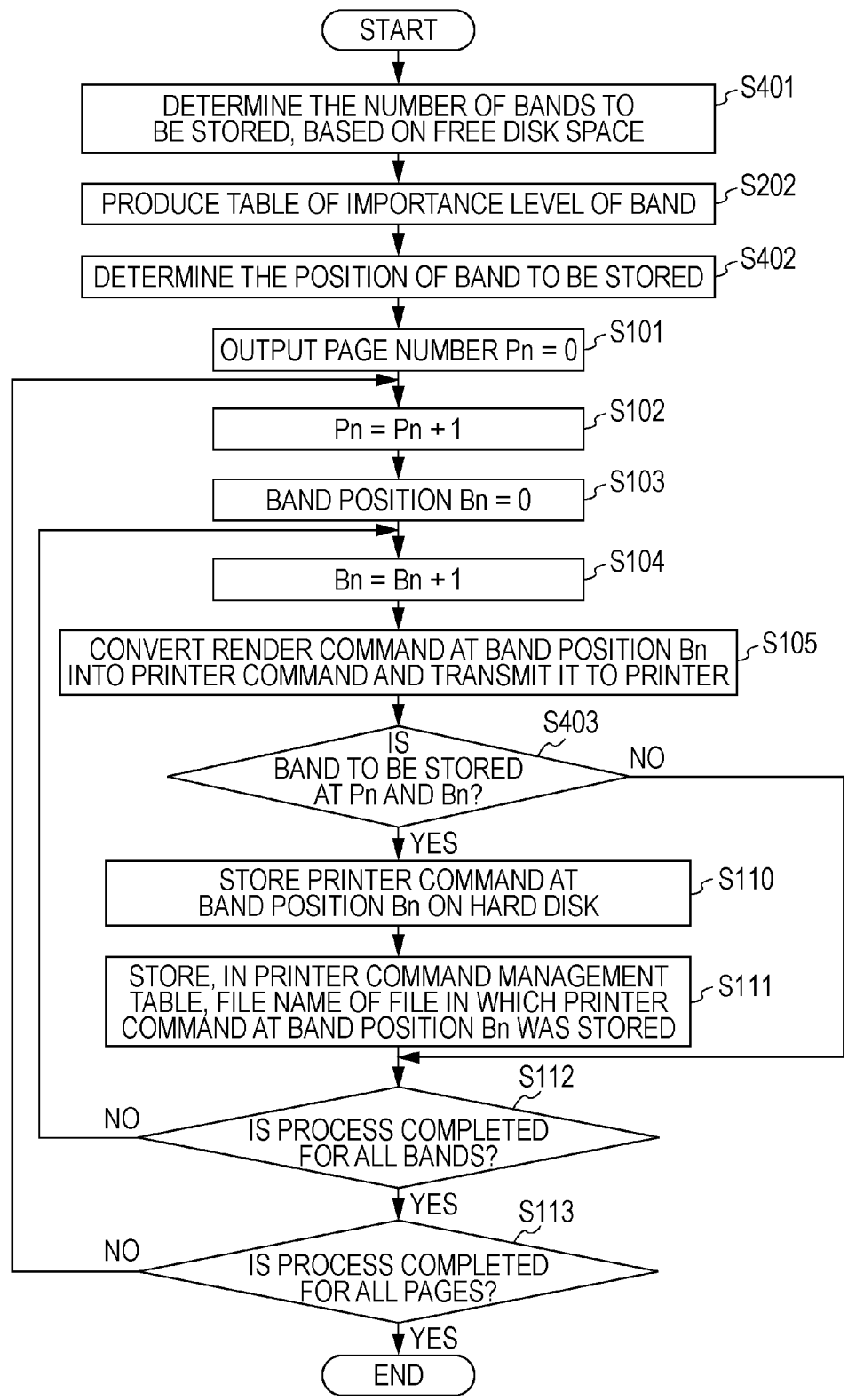
FIG. 8 is a flow chart illustrating an example of a process performed by a printer driver to print a first one of copies according to an embodiment of the present invention.

Referring to a flow chart shown in FIG. 8, an example of a process performed by the printer driver 330 in printing of a first one of a plurality of copies is described.

First, in step S401, the printer command file control unit 337 determines the number of bands to be stored.

More specifically, in this step S401, the printer command file control unit 337 subtracts the estimated size of the storage space of the hard disk 106 to be used by the application 310 or the like from the free storage space of the hard disk 106. The printer command file control unit 337 then divides the resultant value by the printer command size per band. The resultant value indicates the number of bands to be stored.

Next, in step S202, the printer command file control unit 337 produces a table of importance levels of bands and defines therein importance levels of bands in a similar manner as in the first embodiment (see FIG. 6).

Next, in step S402, the printer command file control unit 337 determines positions of bands for which to produce printer command files 108, based on the number of bands determined in step S401. More specifically, for example, in this step S402, the printer command file control unit 337 divides the number of bands determined in step S401 by the number of pages thereby determining positions of bands that can be stored for all pages. Bands with a next highest importance level are assigned to as many bands as the value obtained by subtracting the number of bands stored for all pages from the number of bands determined in step S401. In this case, the bands with the next highest importance level are stored on pages on which the bands can be stored. For example, in a case where the halftone processing is performed using a method other than the error diffusion method, the number of bands that can be stored is 35, and the number of pages is 10, then dividing 35 by 10 yields 3 with a remainder of 5, and thus 3 pages can be stored such that all bands thereof can be stored. Therefore, for 3 bands with highest importance levels (at band positions B3, B5, and B6 (see FIG. 5B)), printer command files 108 thereof are to be stored for all pages. As a result, the number of bands stored in this manner is 30. For remaining 5 bands, printer command files 108 of bands with a fourth importance level (at band position B4) are to be stored only for first to 5th pages.

Following steps S101 to S105 are similar to those according to the first embodiment described above (see FIG. 4).

Next, in step S403, the printer command file control unit 337 determines whether the page Pn specified in step S102 and the band position Bn specified in step S104 correspond to one of band positions determined in step S402. If so, step S110 and following steps are performed. On the other hand, if the page Pn specified in step S102 and the band position Bn specified in step S104 do not correspond to any band position determined in step S402, steps S110 and S111 are skipped, and step S112 and following steps are performed. Steps S110 to S113 are similar to those according to the first embodiment, and thus a further detailed explanation thereof is omitted (see FIG. 4). In the present embodiment, as described above, the printer command file control unit 337 controls storing of printer command files 108 on the hard disk 106 via steps S402, S403, and S110.

In the present embodiment, as described above, the number of bands to be stored is determined according to the free storage space of the hard disk 106, and, based on the determined number of bands and importance levels of bands defined in the table of importance levels of bands, the positions of bands to be stored are determined. When printer commands for bands at the determined positions are obtained, the obtained printer commands are stored at the determined positions. Thus, when the sizes of printer commands of respective bands and the number of pages are known and it is possible to predict the amount of storage space of the hard disk 106 used by the application 310 or the like, the following advantages are obtained in addition to the advantages obtained in the first embodiment. That is, it is not necessary to perform the inefficient process to produce and delete printer command files 108 in the printing process for a first one of a plurality of copies. Thus it is possible to achieve higher efficiency in the processing.

Third Embodiment

A third embodiment of the present invention is described below. In the first and second embodiments described above, the printer 200 performs printing under the control of the host computer 100. In the third embodiment described below, in contrast, a technique is disclosed to directly print a plurality of copies using a multifunction printer, which is a device of a type configured to include a printer and a scanner disposed in an integral manner and which has become very popular in recent years. Thus, the third embodiment is different from the first and second embodiments in the main unit that performs the processing. In the following description of the present embodiment, similar parts to those in the first and second embodiments are denoted by similar reference numerals to those used in FIGS. 1 to 8, and a further detailed explanation thereof is omitted.

Figure 9:
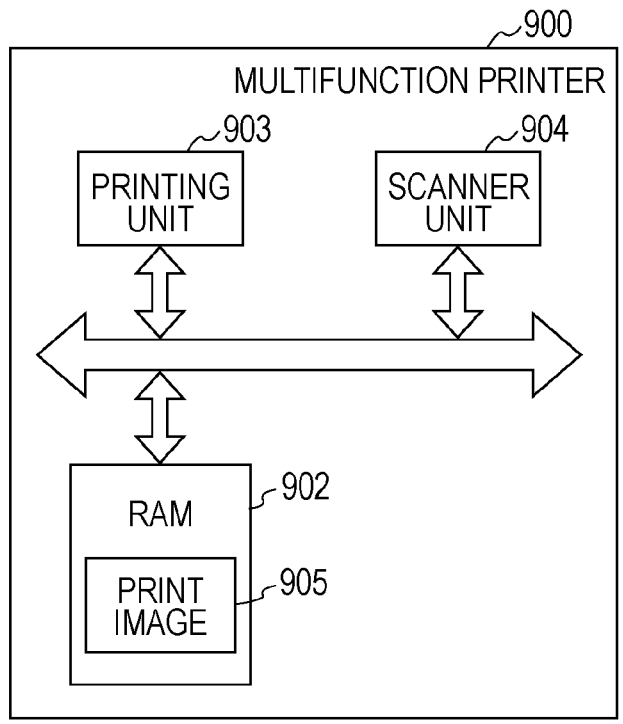
FIG. 9 is a block diagram illustrating an example of a configuration of a multifunction printer according to an embodiment of the present invention.

FIG. 9 is a block diagram illustrating an example of a configuration of the multifunction printer.

In a case of a low-cost multifunction printer 900 including a printing unit 903 and a scanner unit 904, as shown in FIG. 9, the multifunction printer 900 generally has no auxiliary storage device such as a hard disk. When the multifunction printer 900 is of such a type, therefore, after an image is scanned and color processing and halftone processing are performed, resultant data may be stored as a print image 905 in a RAM 902 functioning as a main memory so that the print image 905 can be reused.

However, the storage capacity of the RAM 902 is limited because of its low cost, and thus it is difficult to store many pages of print image 905 in the RAM 202. In a worst case, even one page of print image 905 cannot be stored in the RAM 902.

For the multifunction printer 900 configured in the above-described manner, it is useful to use the technique disclosed in the first or the second embodiment.

In the present embodiment, if the render command according to the first or second embodiment is replaced by the image scanned by the scanner unit 904, and the printer command file 108 is replaced by the print image 905, the processing may be performed in a substantially similar manner to that according to the first or second embodiment. However, it is important to take into account scanning characteristics in producing of the table of importance levels of bands. In general, scanning is lower in processing speed than printing, and thus it is effective to reduce a scanning time. For example, in many scanners, scanning is started from a home position to achieve high accuracy.

Therefore, scanning an area closer to the home position needs a less processing time than needed to scan an area with the same size located far apart from the home position. Thus, in the present embodiment, in each page, a higher importance level is assigned to areas (bands) that are scanned later thereby achieving an increase in total processing speed.

Figure 10:
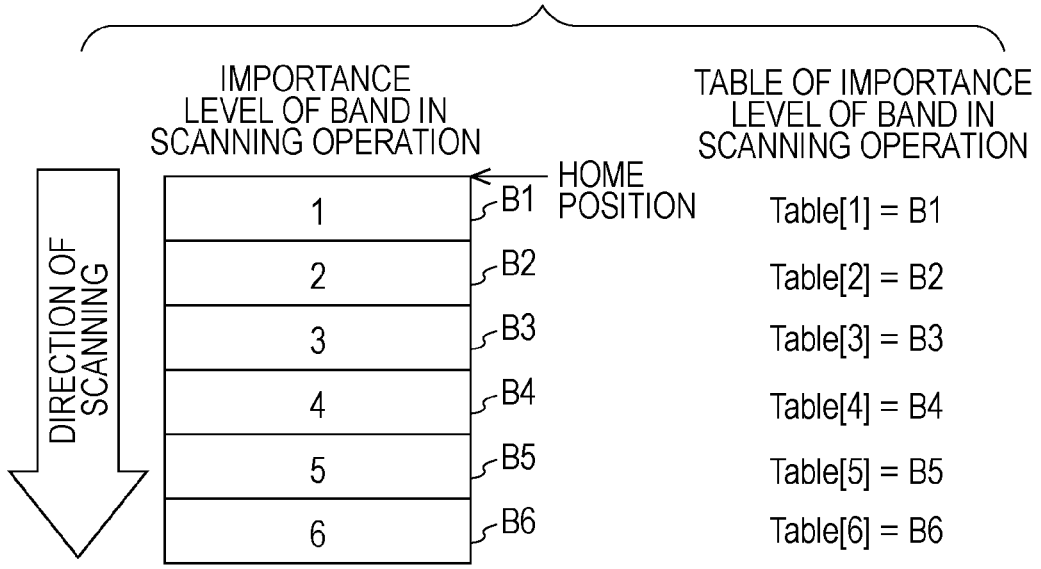
FIG. 10 is a diagram illustrating examples as to importance levels of bands and examples of tables of importance levels of bands according to an embodiment of the present invention.

FIG. 10 illustrates an example as to importance levels of bands and an example of a table of importance levels of bands in printing of an image scanned by the scanner unit 904.

In FIG. 10, by way of example, it is assumed that one page has a total of 6 bands, and 3 bands of print image can be stored. In such a situation, it is further assumed that print images 905 of bands with an importance level equal to 4 or greater described in the table of importance levels of bands (at band positions B4 to B6) are stored in the RAM 902. In this case, in the outputting of second and following ones of a plurality of copies, it is sufficient to scan only a range from the home position to the band position B3. This makes it possible to perform scanning at a higher speed than in the case where all bands are scanned. On the other hand, if bands at band positions B1 to B3 are stored, it is not allowed to scan only bands at band positions B4 to B6, but it is necessary to scan all band positions B1 to B6 starting from the home position.

As described above, when a plurality of copies are printed using the multifunction printer 900 including the printing unit 903 and the scanner unit 904 disposed in the integral manner, even in the case where the multifunction printer 900 does not have the capacity of storing print images 205 for all pages to be printed, it is possible to achieve advantages similar to those obtained in the first or second embodiment.

Other Embodiments

Units of the print control apparatus and steps of the printing control method according to one of embodiments of the present invention may be realized by executing a program stored in a RAM or a ROM of a computer. Note that the program and a computer-readable storage medium in which the program is stored falls within the scope of the present invention.

The present invention may be embodied in many forms such as a system, an apparatus, a method, a program, a storage medium, etc. The present invention may be applied to a system including a plurality of devices or may be applied to an apparatus including only a single device.

A software program that realizes a function of an embodiment of the present invention (for example, a program corresponding to the flow charts shown in FIG. 4 and FIGS. 6 to 8) may be supplied directly or indirectly or remotely to a system or an apparatus. The function of an embodiment of the present invention may be realized by a computer disposed in the system of the apparatus by reading and executing the supplied program code.

Thus, the program code installed on the computer to realize one or more functions according to any of the above-described embodiments of the invention on the computer also falls within the scope of the present invention. That is, the computer program for realizing one or more functions according to any of the above-described embodiments of the invention also falls within the scope of the present invention.

In this case, there is no particular restriction on the form of the program as long as it functions as a program. That is, the program may be realized in various forms such as an object code, a program executed by an interpreter, script data supplied to an operating system, etc.

Specific examples of storage media by which to supply the program include a floppy (registered trademark) disk, a hard disk, an optical disk, a magneto-optical disk, an MO disk, a CD-ROM disk, a CD-R disk, a CD-RW disk, etc. A magnetic tape, a non-volatile memory card, a ROM, a DVD (DVD-ROM, DVD-R) disk, or the like may also be used as the storage medium for the above-described purpose.

The program may also be supplied such that a client computer is connected to an Internet Web site via a browser, and an original computer program or a file including a compressed computer program and an automatic installer may be downloaded into a storage medium such as a hard disk of the client computer thereby supplying the program.

The program code of the program according to an embodiment of the present invention may be divided into a plurality of files, and respective files may be downloaded from different Web sites. Thus, a WWW server that allows a plurality of users to download a program file that realizes one or more functions according to any embodiment of the invention on a computer also falls within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer using the downloaded key information thereby achieving the one or more functions according to any embodiment of the present invention.

One or more functions according to any embodiment of the present invention may be realized by a computer by executing the program. Furthermore, one or more functions according to any embodiment of the present invention may be realized by an OS or the like running on a computer by executing part or all of a process.

A program may be read from a storage medium and loaded into a memory of a function extension board inserted in a computer or into a memory of a function extension unit connected to the computer, and a CPU or the like disposed in the function extension board or the function extension unit may perform part or all of the process according to the loaded program thereby achieving one or more functions according to any embodiment of the invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-193991 filed Jul. 28, 2008, which is hereby incorporated by reference herein in its entirety.

What is claimed is:

1. A print control apparatus including a storage device and configured to supply a printer command used in a printing process performed by a printer in accordance with a print request specifying printing a plurality of copies, comprising:
    a generation unit configured to generate a printer command in units of bands in accordance with the print request;
    a transmission unit configured to transmit the printer command generated by the generation unit to a printer;
    a storing control unit configured to control storing of the printer command such that in the printing process for a first one of the plurality of copies, the printer command generated by the generation unit is stored in units of bands in the storage device; and
    a setting unit configured to set priority according to which the storing control unit is to determine a band to be stored in the storage device such that in a case where halftone processing on the printer command is performed using an error diffusion method, when there are a plurality of bands defined on a page to be subjected to the printing process, relatively low priority is assigned to a band that is subjected relatively early to the halftone processing,
    wherein in the printing process for a second one of the plurality of copies,
        as for the printer command stored in the storage device by the storing control unit, the transmission unit transmits the printer command to the printer, and
        as for a printer command that are not stored in the storage device by the storing control unit, the generation unit again generates the printer command and the transmission unit transmits the generated printer command to the printer.

2. A non-transitory computer readable storage medium on which is stored a computer program which, when executed by a computer, causes the computer to perform a method for supplying a printer command used in a printing process performed by a printer in accordance with a print request specifying printing a plurality of copies, the method comprising:
    generating a printer command in units of bands in accordance with the print request;
    transmitting the printer command generated in the generation to a printer;
    controlling storing of the printer command such that in the printing process for a first one of the plurality of copies, the printer command generated in the generation is stored in units of bands in the storage; and
    setting priority according to which the band is stored in the storage device in the storage control,
    wherein in the printing process for a second one of the plurality of copies,
        as for the printer command stored in the storage device in the storage control, the printer command is transmitted to the printer, and
        as for a printer command that are not stored in the storage device in the storage control, the printer command is again generated and the generated printer command is transmitted to the printer.

3. A print control apparatus including a storage device and configured to supply a printer command used in a printing process performed by a printer in accordance with a print request specifying printing a plurality of copies, comprising:
    a generation unit configured to generate a printer command in units of bands in accordance with the print request;
    a transmission unit configured to transmit the printer command generated by the generation unit to a printer;
    a storing control unit configured to control storing of the printer command such that in the printing process for a first one of the plurality of copies, the printer command generated by the generation unit is stored in units of bands in the storage device; and
    a setting unit configured to set priority according to which the storing control unit is to control storing of the band in the storage device,
    wherein in the printing process for a second one of the plurality of copies,
        as for the printer command stored in the storage device by the storing control unit, the transmission unit transmits the printer command to the printer, and
        as for a printer command that are not stored in the storage device by the storing control unit, the generation unit again generates the printer command and the transmission unit transmits the generated printer command to the printer.

4. The print control apparatus according to claim 3, further comprising a determination unit configured to determine a free storage space of the storage device,
    the storing control unit controls storage of the printer command such that if the determination unit determines that the storing of the printer command in the storage device causes the free storage space to become equal to or lower than a threshold value, then, among printer commands already stored in the storage device, a printer command of a band having relatively low priority assigned by the setting unit is deleted.

5. The print control apparatus according to claim 3, wherein the storing control unit determines a band to be stored in the storage device according to the priority set by the setting unit, and the storing control unit controls storing such that, among printer commands, a printer command of the determined band is stored in the storage device.

6. The print control apparatus according to claim 3, wherein the setting unit sets the priority such that when there are a plurality of bands defined on a page to be subjected to the printing process, relatively low priority is assigned to a band that is supplied relatively early.

7. The print control apparatus according to claim 3, wherein the setting unit sets the priority such that among a plurality of bands defined on a page to be subjected to the printing process, for at least three successive bands supplied later than a band supplied first, high priority and low priority are alternately assigned.

8. The print control apparatus according to claim 3, wherein the setting unit sets the priority such that when there are a plurality of bands defined on a page to be subjected to the printing process, high priority is assigned to a band that needs a relatively long time in the rendering process.

9. The print control apparatus according to claim 3, wherein the setting unit sets priority such that in a case where halftone processing on the printer command is performed using an error diffusion method, when there are a plurality of bands defined on a page to be subjected to the printing process, relatively low priority is assigned to a band that is subjected relatively early to the halftone processing.

10. The print control apparatus according to claim 3, wherein the setting unit sets the priority in a case where the printer command is produced via a reading process performed by a scanner such that when there are a plurality of bands defined on a page to be subjected to the printing process, relatively low priority is assigned to a band that is scanned relatively early.

11. A print control apparatus including a storage device and configured to supply a printer command used in a printing process performed by a printer in accordance with a print request specifying printing a plurality of copies, comprising:
  a generation unit configured to generate a printer command in units of bands in accordance with the print request;
  a transmission unit configured to transmit the printer command generated by the generation unit to a printer; and
  a storing control unit configured to control storing of the printer command such that in the printing process for a first one of the plurality of copies, the printer command generated by the generation unit is stored in units of bands in the storage device,
  wherein in the printing process for a second one of the plurality of copies,
    as for the printer command stored in the storage device by the storing control unit, the transmission unit transmits the printer command to the printer, and
    as for a printer command that are not stored in the storage device by the storing control unit, the generation unit again generates the printer command and the transmission unit transmits the generated printer command to the printer, and
  wherein the storing control unit controls the storage of the printer command such that among printer commands used in the printing process, a printer command of a band including a rendering area is stored in the storage device.

12. A method in a printing system including a storage device and configured to supply a printer command used in a printing process performed by a printer in accordance with a print request specifying printing a plurality of copies, comprising:
  generating a printer command in units of bands in accordance with the print request;
  transmitting the printer command generated in the generation to a printer; and
  controlling storing of the printer command such that in the printing process for a first one of the plurality of copies, the printer command generated in the generation is stored in units of bands in the storage device,
  wherein in the printing process for a second one of the plurality of copies,
    as for the printer command stored in the storage device in the storage control, the printer command is transmitted to the printer; and
    as for a printer command that are not stored in the storage device in the storage control, the printer command is again generated and the generated printer command is transmitted to the printer, and
  wherein in the storage control, among printer commands used in the printing process, a printer command of a band including a rendering area is stored in the storage device.

13. A method in a printing system including a storage device and configured to supply a printer command used in a printing process performed by a printer in accordance with a print request specifying printing a plurality of copies, comprising:
  generating a printer command in units of bands in accordance with the print request;
  transmitting the printer command generated in the generation to a printer;
  controlling storing of the printer command such that in the printing process for a first one of the plurality of copies, the printer command generated in the generation is stored in units of bands in the storage device; and
  setting priority according to which the band is stored in the storage device in the storage control,
  wherein in the printing process for a second one of the plurality of copies,
    as for the printer command stored in the storage device in the storage control, the printer command is transmitted to the printer, and
    as for a printer command that are not stored in the storage device in the storage control, the printer command is again generated and the generated printer command is transmitted to the printer.

14. The method according to claim 13, further comprising determining a free storage space of the storage device,
  wherein in the storage control, if it is determined in the determination that the storing of the printer command in the storage device causes the free storage space to become equal to or lower than a threshold value, then, among printer commands already stored in the storage device, a printer command of a band having relatively low priority assigned in the setting is deleted.

15. The method according to claim 13, wherein the storage control includes determining a band to be stored in the storage device according to the priority set in the setting, and controlling storing such that, among printer commands, a printer command of the determined band is stored in the storage device.

16. The method according to claim 13, wherein in the setting, the priority is set such that when there are a plurality of bands defined on a page to be subjected to the printing process, relatively low priority is assigned to a band that is supplied relatively early.

17. The method according to claim 13, wherein in the setting, the priority is set such that among a plurality of bands defined on a page to be subjected to the printing process, for at least three successive bands supplied later than a band supplied first, high priority and low priority are alternately assigned.

18. The method according to claim 13, wherein in the setting, the priority is set such that when there are a plurality of bands defined on a page to be subjected to the printing process, high priority is assigned to a band that needs a relatively long time in the rendering process.

19. The method according to claim 13, wherein in the setting, the priority is set such that in a case where halftone processing on the printer command is performed using an error diffusion method, when there are a plurality of bands defined on a page to be subjected to the printing process, relatively low priority is assigned to a band that is subjected relatively early to the halftone processing.

20. The method according to claim 13, wherein in the setting, in a case where the printer command is produced via a reading process performed by a scanner, the priority is set such that when there are a plurality of bands defined on a page to be subjected to the printing process, relatively low priority is assigned to a band that is scanned relatively early.

* * * * *